(12) United States Patent
Kleinow et al.

(10) Patent No.: US 9,033,775 B2
(45) Date of Patent: May 19, 2015

(54) CAM AND LEVER ASSEMBLY

(75) Inventors: Aaron Kleinow, Clarkston, MI (US); Doug Forsyth, Waterford, MI (US); Dave Kolton, Howell, MI (US)

(73) Assignee: MAHLE BEHR USA INC., Troy, MI (US)

( * ) Notice: Subject to any disclaimer, the term of this patent is extended or adjusted under 35 U.S.C. 154(b) by 1185 days.

(21) Appl. No.: 12/521,637

(22) PCT Filed: Jan. 8, 2008

(86) PCT No.: PCT/US2008/050494
§ 371 (c)(1),
(2), (4) Date: Jun. 29, 2009

(87) PCT Pub. No.: WO2008/088977
PCT Pub. Date: Jul. 24, 2008

(65) Prior Publication Data
US 2010/0087133 A1    Apr. 8, 2010

Related U.S. Application Data

(60) Provisional application No. 60/884,858, filed on Jan. 12, 2007.

(51) Int. Cl.
*B60H 1/34* (2006.01)
*F16H 53/06* (2006.01)
*B60H 1/00* (2006.01)
*F16H 53/02* (2006.01)

(52) U.S. Cl.
CPC ............ *F16H 53/06* (2013.01); *B60H 1/00857* (2013.01); *F16H 53/02* (2013.01)

(58) Field of Classification Search
USPC .............................................. 454/152; 74/54
See application file for complete search history.

(56) References Cited

U.S. PATENT DOCUMENTS

| | | | | |
|---|---|---|---|---|
| 2,250,393 A | * | 7/1941 | Rado ............................. | 180/406 |
| 2,343,417 A | * | 3/1944 | Kornei ......................... | 369/173 |
| 2,377,559 A | * | 6/1945 | Johnston ....................... | 74/500 |
| 2,573,723 A | * | 11/1951 | McClain, Jr. ................. | 369/173 |
| 2,660,088 A | * | 11/1953 | Serra ............................ | 352/109 |
| 2,953,031 A | * | 9/1960 | Elman et al. .................. | 74/54 |
| 3,292,936 A | * | 12/1966 | Grado .......................... | 369/173 |

(Continued)

FOREIGN PATENT DOCUMENTS

| | | |
|---|---|---|
| DE | 101 27 650 A1 | 12/2002 |
| FR | 2 757 240 A1 | 6/1998 |
| JP | 2006077842 A * | 3/2006 |

OTHER PUBLICATIONS

Gottwald, FR275240 English machine translation, Jun. 19, 1998.*

(Continued)

*Primary Examiner* — Alissa Tompkins
*Assistant Examiner* — Phillip E Decker
(74) *Attorney, Agent, or Firm* — Foley & Lardner LLP

(57) ABSTRACT

A cam and lever system comprising a cam having a side perpendicular to an axis of rotation of the cam and a channel on the side of the cam, the channel having a bottom wherein the channel is at least partially defined by a first wall and a second wall that diverge as the distance from the bottom increases, a lever, having a pin extending into the channel and an axis of rotation that is generally parallel to the axis of rotation of the cam, and having a configuration sufficient to provide point contact with the walls of the channel.

19 Claims, 11 Drawing Sheets

(56) References Cited

U.S. PATENT DOCUMENTS

| | | | |
|---|---|---|---|
| 4,098,030 A * | 7/1978 | Fuhrer et al. | 451/28 |
| 4,656,926 A * | 4/1987 | Bauer et al. | 454/143 |
| 5,400,523 A * | 3/1995 | Hatheway | 33/828 |
| 5,669,021 A * | 9/1997 | Sato | 396/72 |
| 5,701,949 A * | 12/1997 | Yamaguchi et al. | 165/42 |
| 6,032,723 A * | 3/2000 | Tsuihiji et al. | 165/42 |
| 6,538,826 B2 * | 3/2003 | Koiwai et al. | 359/700 |
| 6,959,468 B1 * | 11/2005 | Danger | 16/426 |
| 7,168,412 B2 * | 1/2007 | Cooke et al. | 123/468 |
| 2006/0030255 A1 * | 2/2006 | Seki | 454/121 |
| 2008/0041557 A1 | 2/2008 | Braun | |

OTHER PUBLICATIONS

Shigley et al, Standard Handbook of Machine Design, McGraw-Hill, pp. 39.8-39.9, 1986.*

Gottwald, FE 2757240 A1 English machine translation, Jun. 19, 1998.*

* cited by examiner

CAM AND LEVER ASSEMBLY

BACKGROUND

The present application relates generally to the field of cam and lever assemblies. More particular, the application relates to cam and lever assemblies that may be used for the opening and closing of doors and/or vents, for example, in an HVAC system, such as that employed in a vehicle.

Conventional cam and lever assemblies for the opening and closing of doors and vents include a cam having a channel and a lever including a pin. The pin is generally configured to fit within the channel. Rotation of the cam causes a wall of the channel to exert a force on the pin. This in turn causes the lever to rotate about an axis on which a door may be mounted. In some of these assemblies, the channel may have a generally U-shaped crossection defined by two parallel walls. In these assemblies, the pin may have a generally cylindrical shape. When assembled, the curved side of the cylindrical pin will be substantially parallel with the walls of the channel.

However, to allow movement of the pin relative to the channel, the pin must have a diameter smaller than the width of the channel. This results in an assembly where the pin can move relative to the channel even when the cam is not rotated. In particular, the pin may be able to more tangentially in relation to the channel. This tangential movement translates into movement of the lever and any door coupled thereto.

In ventilation applications, the undesired movement or play allows the door to change position, especially when air is forced through the duct in which the door is located. This movement may give rise to undesirable vibration that may lead to noise and/or part failure.

Accordingly, it would be desirable to provide a cam and lever assembly that reduces play between the cam and the lever and reduces undesirable movement of the lever relative to the cam.

DETAILED DESCRIPTION OF THE PREFERRED EMBODIMENTS

Figure 1:
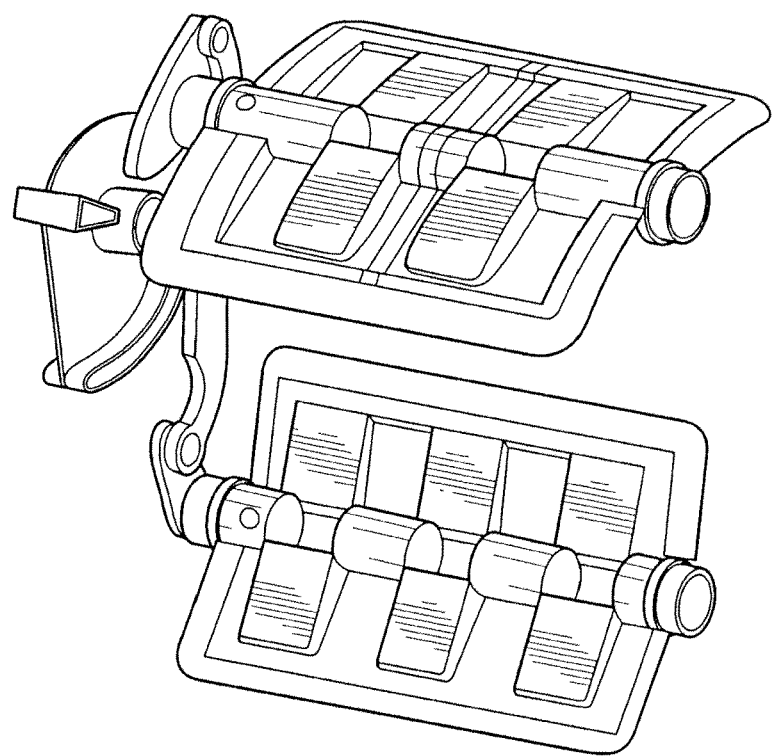
FIG. 1 is a perspective view of a cam and lever assembly.

Referring to FIG. 1, a system for opening and closing doors in a ventilation system, e.g., an HVAC system in a vehicle, may include a cam and lever assembly including a cam, a first lever, an elongated member, and a second lever. The present invention is most preferably utilized in a vehicle system of the type disclosed in U.S. patent application Ser. No. 11/504,100, filed Aug. 15, 2006, the entire disclosure of which is hereby incorporated by reference. The cam may be coupled to a driven shaft that causes the cam to rotate about a first axis. The first lever may be coupled to a first door. When the cam is rotated, the walls of the cam channel exert forces on a pin of the first lever. The pin travels along a trace defined by the channel as the cam rotates. This in turn rotates the first lever about an axis. In the system shown, the first door is mounted coaxially with the first lever. The first lever has a joint at a position distal to the pin where the elongated member may be coupled to the first lever. The elongated member is also coupled to the second lever which is mounted to rotate about another axis. The second door may be mounted coaxially with the second lever. While a two door system is shown, one or more doors may be used.

Figure 2:
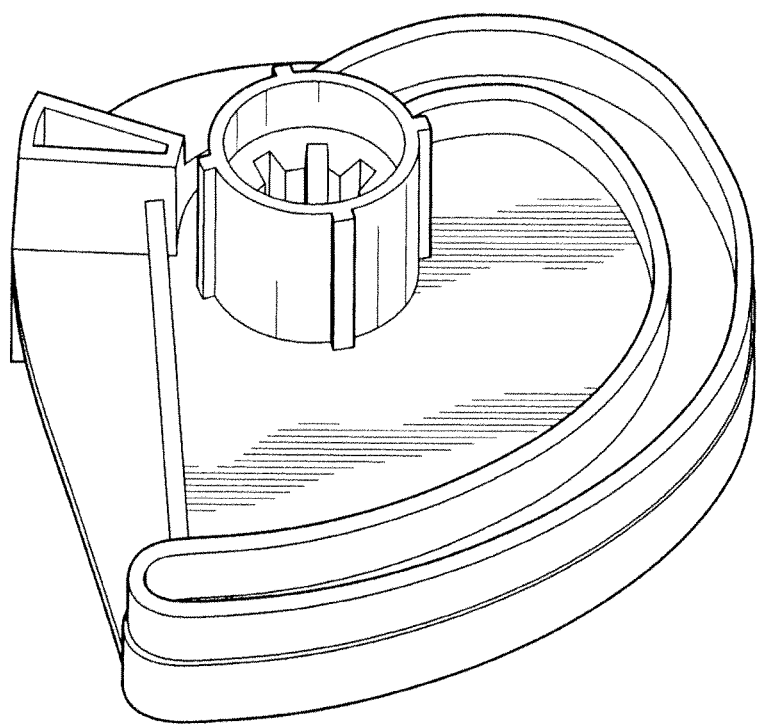
FIG. 2 is a perspective view of the cam of FIG. 1.
Figure 3:
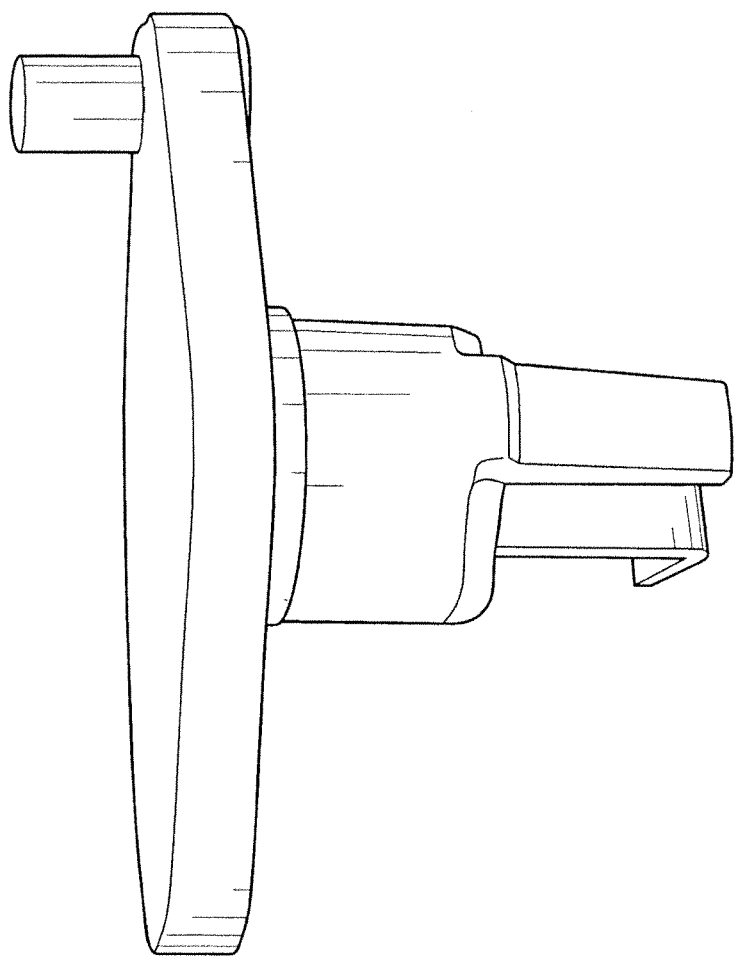
FIG. 3 is a perspective view of the lever of FIG. 1.

FIGS. 2 and 3, show the cam and first lever of FIG. 1 in greater detail. The channel of the cam is defined by three surfaces (a bottom, an inner wall, and an outer wall). The pin of the first lever is configured to extend into the channel of the cam when the system is assembled. The pin has an end surface and a curved side in the form of a right cylinder.

Figure 4:
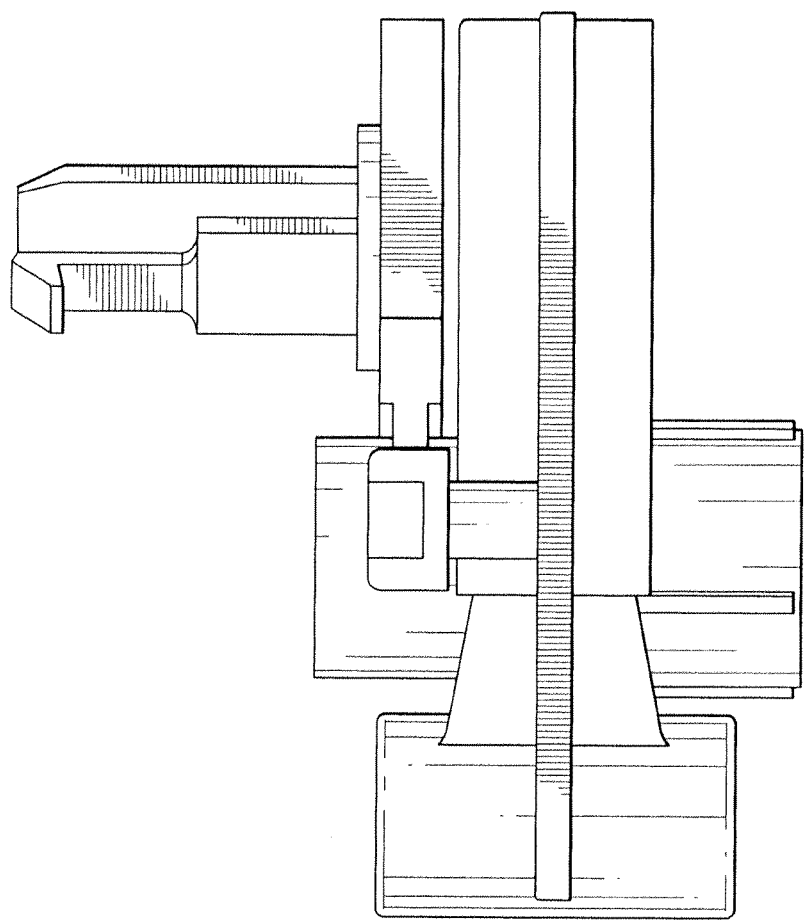
FIG. 4 is a perspective view of the cam and lever assembly of FIG. 1.

As shown in FIG. 4, the pin of the first lever is narrower than the width of the channel, to allow the pin to move along the trace. The pin is generally narrowed even more than the minimum necessary for movement, in order to accommodate variations in the channel that may result during the manufacturing of the cam. A design having a cylindrical pin in a U-shaped channel with a channel width greater than the diameter of the pin disadvantageously allows the pin to travel tangentially in relation to the channel without rotation of the cam. The tangential movement of the lever results in rotating the axis on which the first door is mounted. Tangential movement forces the pin to contact the walls of the U-shaped channel in a line-contact configuration, along the axis of the pin, which causes binding of the pin. Also, the end surface of the pin may contact the bottom of the channel. Both can result in a relatively large contact area between the pin and the channel that increases friction between the end surface of the pin and the bottom surface of the channel.

A cam comprising a channel having a bottom wherein the channel is at least partially defined by walls that diverge as the distance from the bottom increases is shown in FIGS. 5 through 8. These figures illustrate a preferred embodiment in which the cam has a V-shaped channel, and a lever has a conical pin. The channel is defined, at least in part, by two surfaces. The two surfaces diverge as the distance from the bottom of the channel increases. The channel may have a curved or flat bottom surface. Alternatively, the two sides of the channel may join at a line forming a sharp corner. In some embodiments, the channel may have a V-shaped cross-section. In other embodiments, the cross-section may be parabolic, round, or any other suitable cross-section in which the walls of the channel diverge as the distance from the bottom of the channel increases.

The lever includes a pin for contacting the surfaces of the channel. In some embodiments, a cylindrical pin (such as that shown in FIG. 3) may be used. In such embodiments the end surface of the pin and the curved surface may come together at a right angle. This allows the pin to contact the channel at two points along the circumference of the end surface. In the preferred embodiment shown, the pin is generally conical in shape with a rounded end. Other configurations may be used such as a conical pin having a flat end or an angled end.

Figure 5:
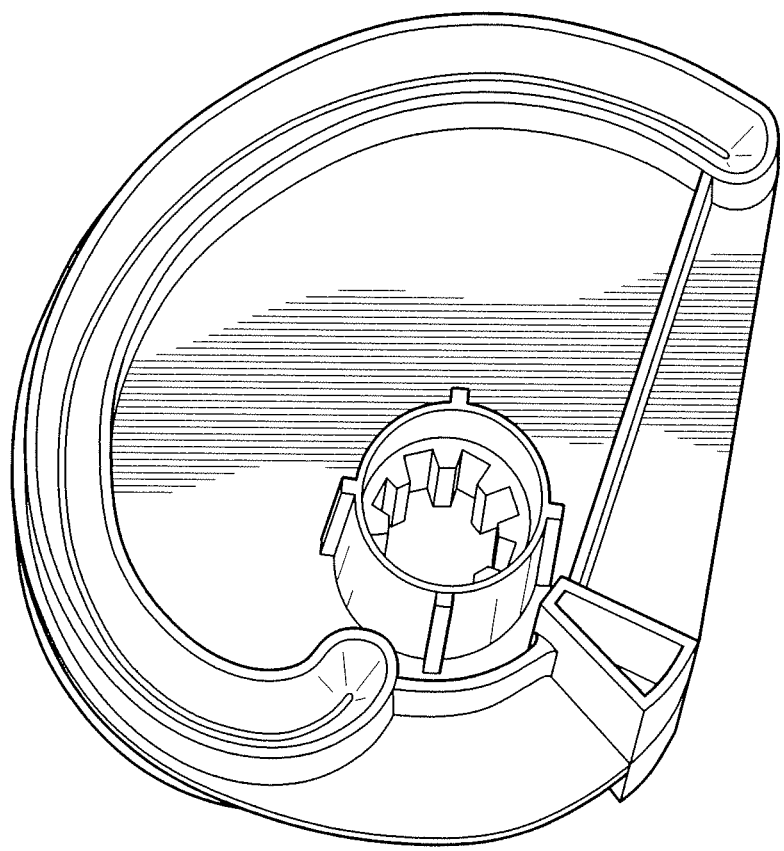
FIG. 5 is a perspective view of a cam according to one embodiment of the invention.
Figure 6:
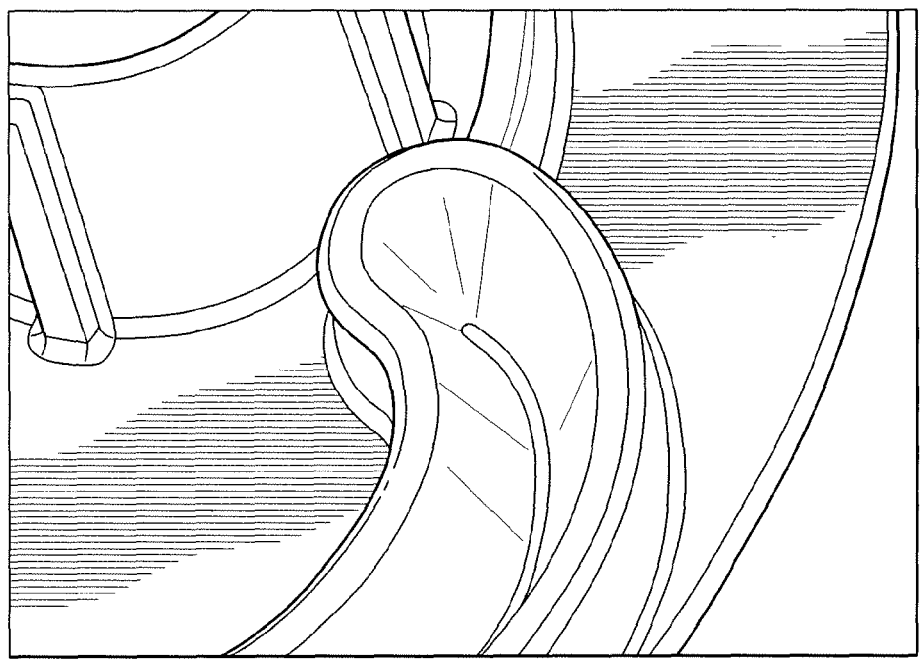
FIG. 6 is another perspective view of the cam of FIG. 5.
Figure 7:
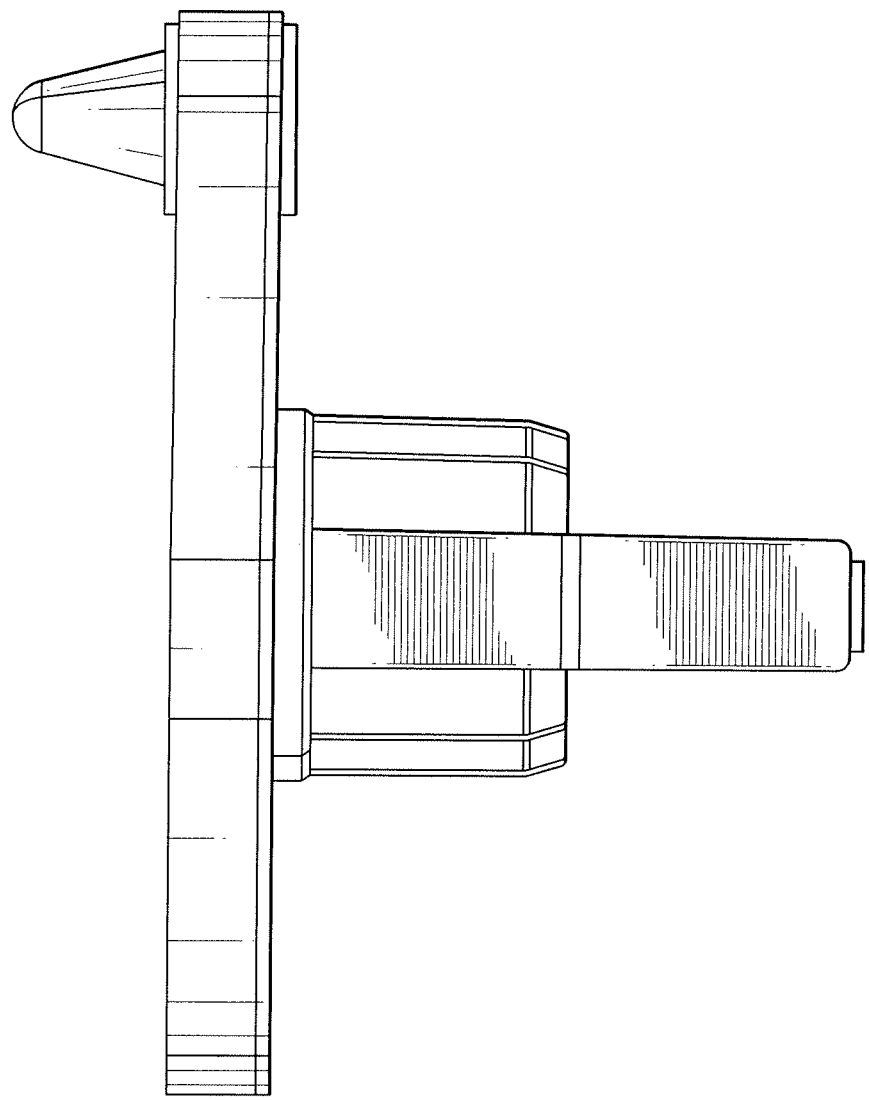
FIG. 7 is an elevation view of a lever.
Figure 8:
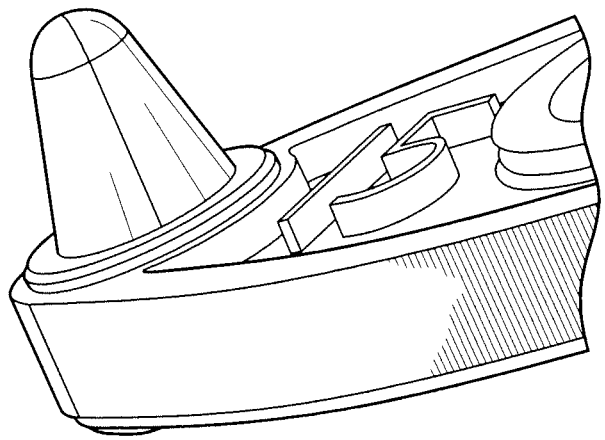
FIG. 8 is a perspective view of the lever of FIG. 7.
Figure 9:
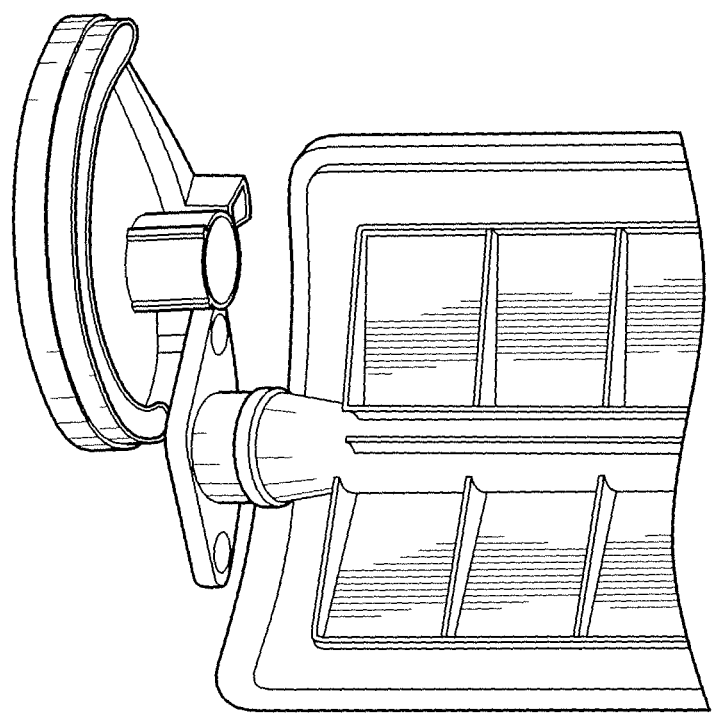
FIG. 9 is a perspective view of a cam and lever assembly according to one embodiment of the invention.
Figure 10:
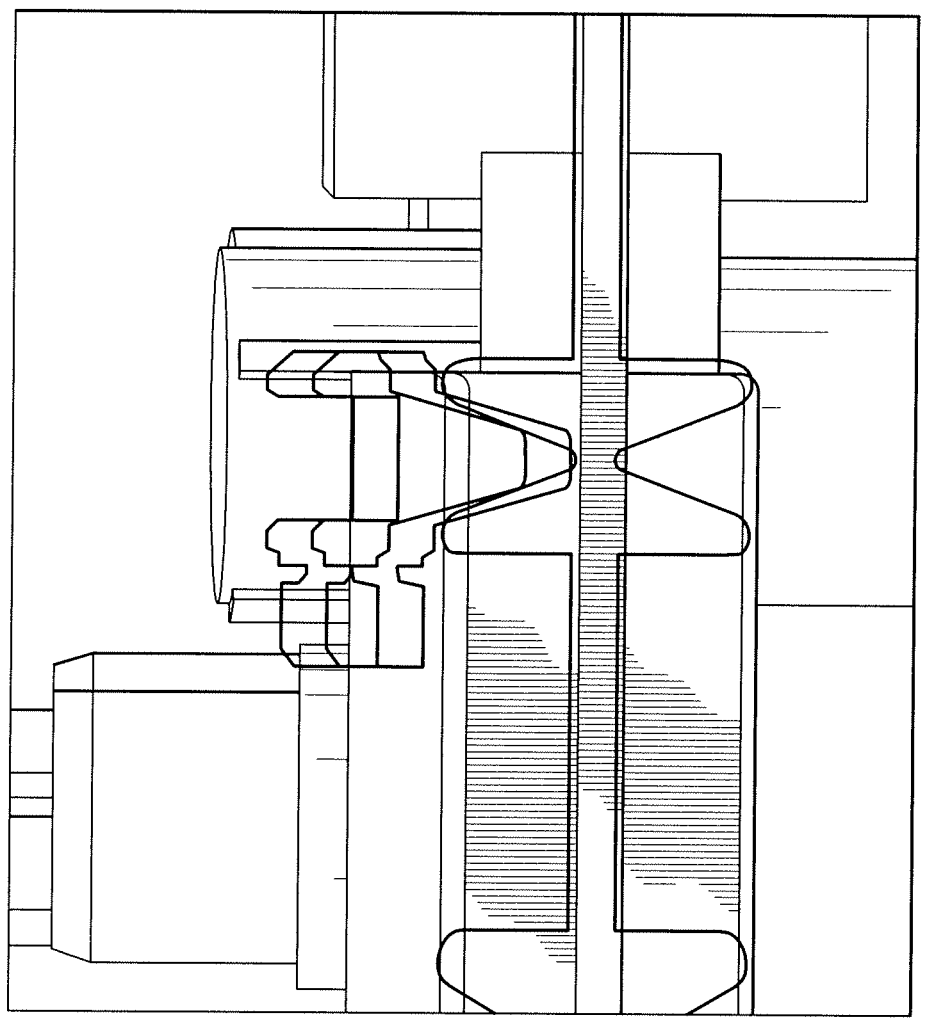
FIG. 10 is perspective view of the cam and lever assembly of FIG. 9.
Figure 11:
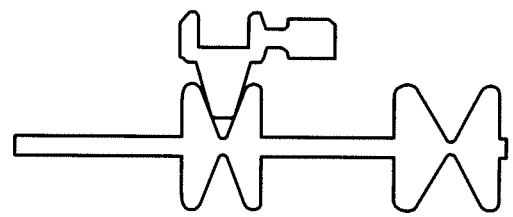
FIG. 11 is a schematic crossectional view of the cam and lever assembly of FIG. 9.

FIGS. 9 through 11 illustrate a cam and lever assembly using the cam of FIGS. 5 and 6 and the lever of FIGS. 7 and 8. The pin is configured to contact the channel at two points (i.e., the pin contacts each side of the channel at a single point). By contacting the channel at only two points, the contact are is greatly reduced as compared to the assembly of FIG. 1. Also, while the pin is in contact with both sides of the channel, the pin cannot move tangentially without rotation of the cam. Accordingly, play between the pin and the channel and unwanted movement of the doors may be reduced. As shown in FIG. 10, in an exemplary embodiment the conical lever is positioned such that the pin is displaced by the cam. The resulting mechanical stress on the lever biases the pin towards the bottom of the channel to further reduce play in the assembly. Alternatively, the cam or the lever may be spring biased.

Figure 12:
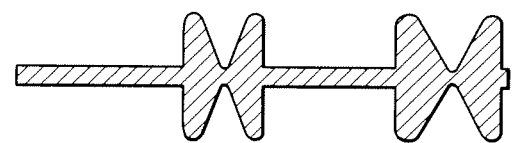
FIG. 12 is a schematic crossectional view of the cam of FIG. 9.
Figure 13:
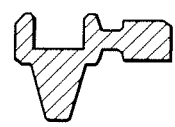
FIG. 13 is a schematic crossectional view of the lever of FIG. 9.

While a variety of channel and pin configurations may be used, a V-shaped channel and a conical pin have been found to be particularly suitable. FIGS. 11 through 13 illustrate some exemplary configurations. As shown if FIG. 12, a V-shaped channel may have sides arranged at an angle (with respect to a vertical to the plane in which the channel is formed) between about 5° to 40°, preferably between 7.5° to 37.5°. In a preferred embodiment, the walls of the channel may be arranged at an angle of about 20° to 25°, e.g., 22.5°. To prevent the conical shaped pin from contacting the bottom of the channel, the side of the conical pin preferably forms a more acute angle than the angle of the channel sides. As shown in FIG. 13, the side of the conical pin may be at an angle between 0° and 30° to the axis of the conical pin. It should be noted that angles less than 0° may also be used. In a preferred embodiment, the angle of the conical pin may be about 5° to 10° less than the angle of the channel walls, e.g., 15°.

Although the foregoing has been described with reference to exemplary embodiments, workers skilled in the art will recognize that changes may be made in form and detail without departing from the spirit and scope thereof. For example, although different example embodiments may have been described as including one or more features providing one or more benefits, it is contemplated that the described features may be interchanged with one another or alternatively be combined with one another in the described example embodiments or in other alternative embodiments. The present subject matter described with reference to the example embodiments and set forth in the following claims is manifestly intended to be as broad as possible. For example, unless specifically otherwise noted, the claims reciting a single particular element also encompass a plurality of such particular elements. Many other changes and modifications may be made to the present invention without departing from the spirit thereof. The scope of these and other changes will become apparent from the appended claims. The steps of the methods described herein may be varied, and carried out in different sequences.

What is claimed is:

1. An HVAC system for a vehicle comprising:
    an air passage;
    at least one air flow control member; and
    a cam and lever system comprising:
        a cam having a side perpendicular to an axis of rotation of the cam and a channel on the side of the cam, the channel having a bottom wherein the channel is at least partially defined by a first wall and a second wall that diverge as a distance from the bottom increases; and
        a lever having a pin extending into the channel and an axis of rotation that is parallel to the axis of rotation of the cam, wherein the pin is configured to provide point contact at two points, a first point on the first wall of the channel and a second point on the second wall of the channel, without contacting the bottom of the channel, wherein the pin is conical with a cross section being formed by converging first and second lines, the first point being on the first line and the second point being on the second line,
        wherein while the pin is in point contact with the first wall and the second wall of the channel, the pin cannot move tangentially without rotation of the cam, and
        wherein the HVAC system is configured for use in a vehicle.

2. The HVAC system of claim 1, wherein a ventilation door is mounted on the lever such that rotation of the cam causes the ventilation door to open or close.

3. The HVAC system of claim 1, wherein an angle defined by a major axis of the pin and a surface of the pin is 0° to 30°.

4. The HVAC system of claim 1, wherein an angle formed by the first wall and a line normal to the side of the cam is 7.5° to about 37.5°.

5. The HVAC system of claim 1, wherein the channel is v-shaped.

6. The HVAC system of claim 1, wherein an angle defined by a major axis of the pin and a surface of the pin is more acute than an angle formed by the first wall and a line normal to the side of the cam.

7. The HVAC system of claim 1, wherein an angle defined by a major axis of the pin and a surface of the pin is less acute than an angle formed by the first wall and a line normal to the side of the cam.

8. The HVAC system of claim 1, wherein the lever is positioned such that the pin is displaced by the cam, and a resulting mechanical stress on the lever is configured to bias the pin towards the bottom of the channel.

9. The HVAC system of claim 1, wherein one of the cam and the lever is spring biased in order to bias the pin towards the bottom of the channel.

10. An HVAC system for a vehicle comprising:
    an air passage;
    at least one air flow control member; and
    a cam and lever system comprising:
        a cam having a side perpendicular to an axis of rotation of the cam and a channel on the side of the cam, the channel having a bottom wherein the channel is at least partially defined by a first wall and a second wall that diverge as a distance from the bottom increases; and
        a lever having a pin extending into the channel and an axis of rotation that is parallel to the axis of rotation of the cam, wherein the pin is configured to provide point contact at two points, a first point on the first wall of the channel and a second point on the second wall of the channel, without contacting the bottom of the channel, and
        wherein the pin is conical with a cross section being formed by converging first and second lines, the first point being on the first line and the second point being on the second line, and
        wherein while the pin is in point contact with the first wall and the second wall of the channel, the pin cannot move tangentially without rotation of the cam.

11. The HVAC system of claim 10, wherein an angle defined by a major axis of the pin and a surface of the pin is 0° to 30°.

12. The HVAC system of claim 10, wherein an angle formed by the first wall and a line normal to the side of the cam is 7.5° to about 37.5°.

13. The HVAC system of claim 10, wherein the channel is v-shaped.

14. The HVAC system of claim 10, wherein an angle defined by a major axis of the pin and a surface of the pin is more acute than an angle formed by the first wall and a line normal to the side of the cam.

15. The HVAC system of claim 10, wherein an angle defined by a major axis of the pin and a surface of the pin is less acute than an angle formed by the first wall and a line normal to the side of the cam.

16. The HVAC system of claim 10, wherein the HVAC system is configured for use in a vehicle.

17. The HVAC system of claim 10, wherein a ventilation door is mounted on the lever such that rotation of the cam causes the ventilation door to open or close.

18. The HVAC system of claim 10, wherein the lever is positioned such that the pin is displaced by the cam, and a resulting mechanical stress on the lever is configured to bias the pin towards the bottom of the channel.

19. The HVAC system of claim 10, wherein one of the cam and the lever is spring biased in order to bias the pin towards the bottom of the channel.

\* \* \* \* \*